United States Patent [19]

Brandt et al.

[11] Patent Number: 5,260,133

[45] Date of Patent: Nov. 9, 1993

[54] PROCESS FOR COATING POLYCARBONATE MOLDINGS AND RESULTING MOLDINGS

[75] Inventors: Heinz-Dieter Brandt, Krefeld; Wolfgang Fischer, Meerbusch; Christian Leuschke, Dormagen; Gerhard Kranz, Leverkusen, all of Fed. Rep. of Germany

[73] Assignee: Bayer Aktiengesellschaft, Leverkusen, Fed. Rep. of Germany

[21] Appl. No.: 914,839

[22] Filed: Jul. 16, 1992

[30] Foreign Application Priority Data

Jul. 26, 1991 [DE] Fed. Rep. of Germany ....... 4124806

[51] Int. Cl.$^5$ .............................................. B05D 3/06
[52] U.S. Cl. .................................... 428/412; 427/515; 427/553; 427/595; 428/413; 428/447
[58] Field of Search ............... 427/508, 515, 553, 595; 428/412, 447, 413

[56] References Cited

U.S. PATENT DOCUMENTS

| | | | |
|---|---|---|---|
| 3,707,397 | 12/1972 | Gagnon | 117/72 |
| 3,843,390 | 10/1974 | Hudson et al. | 117/138.8 F |
| 3,968,305 | 7/1976 | Oshima et al. | 428/334 |
| 4,124,730 | 11/1978 | Albert et al. | 427/220 |
| 4,279,717 | 7/1981 | Eckberg et al. | 204/159.13 |
| 4,547,431 | 10/1985 | Eckberg | 428/413 |
| 4,576,999 | 3/1986 | Eckberg | 525/476 |
| 4,666,779 | 5/1987 | Curry | 428/412 |
| 4,902,724 | 2/1990 | Moore | 522/40 |

FOREIGN PATENT DOCUMENTS

| | | |
|---|---|---|
| 391162 | 10/1990 | European Pat. Off. . |
| 404029 | 12/1990 | European Pat. Off. . |
| 431809 | 6/1991 | European Pat. Off. . |

*Primary Examiner*—Bernard Pianalto
*Attorney, Agent, or Firm*—Joseph C. Gil; Aron Preis

[57] ABSTRACT

A UV-curable composition suitable for coating polycarbonate molded articles is disclosed. Accordingly the composition contains A) from 10 to 100% by weight of a polysiloxane which contains epoxy groups and is free from OH groups, and optionally B) from 0 to 90% by weight of compounds other than A) which also contain epoxy groups and are free from OH groups, and/or optionally C) from 0 to 40% by weight of compounds which are free from epoxy groups but contain hydroxyl groups, where components A)+B)+C) add up to 100% by weight, together with D) from 0.1 to 15% relative to the weight of A+B+C of photoinitiators and optionally E) from 0 to 0.5% relative to the weight of A+B+C of sensitizers.

In accordance with the invention, the composition is applied to the moldings of thermoplastic polycarbonates and then cured.

6 Claims, No Drawings

PROCESS FOR COATING POLYCARBONATE MOLDINGS AND RESULTING MOLDINGS

FIELD OF THE INVENTION

The invention relates to polycarbonate articles and more particularly, to molded articles coated with a UV-curable composition.

SUMMARY OF THE INVENTION

A UV-curable composition suitable for coating polycarbonate molded articles is disclosed. Accordingly the composition contains A) from 10 to 100% by weight of a polysiloxane which contains epoxy groups and is free from OH groups, and optionally B) from 0 to 90% by weight of compounds other than A) which also contain epoxy groups and are free from OH groups, and/or optionally C) from 0 to 40% by weight of compounds which are free from epoxy groups but contain hydroxyl groups, where components A)+B)+C) add up to 100% by weight, together with D) from 0.1 to 15% relative to the weight of A+B+C of photoinitiators and optionally E) from 0 to 0.5% relative to the weight of A+B+C of sensitizers.

In accordance with the invention, the composition is applied to the moldings of thermoplastic polycarbonates and then cured.

DETAILED DESCRIPTION OF THE INVENTION

The present invention relates to the use of UV curable compositions containing

A) from 10 to 100% by weight, preferably from 28 to 88by weight and in particular from 45 to 85% by weight of a polysiloxane which contains epoxy groups and is free from OH groups, and optionally B) from 0 to 90% by weight, preferably from 10 to 70% by weight and in particular from 10 to 50% by weight of compounds other than A) which also contain epoxy groups and are free from OH groups, and/or optionally C) from 0 to 40% by weight, preferably from 2 to 20% by weight and in particular from 5 to 15% by weight of compounds which are free from epoxy groups but contain hydroxyl groups, under the condition that the percentages by weight of components A)+B)+C) always add up to 100% by weight, together with D) from 0.1 to 15% by weight, preferably from 0.5 to 5% by weight, based on 100% by weight of A)+B)+C), of photoinitiators and optionally E) from 0 to 0.5% by weight, preferably from 0.01 to 0.5% by weight, based on 100% by weight of A)+B)+C), of sensitizers for coating moldings of thermoplastic polycarbonates.

The compositions are applied to the moldings of thermoplastic polycarbonates and then cured.

The present invention thus also relates to a process for coating moldings of thermoplastic polycarbonates, characterized in that the compositions to be used according to the invention are applied to moldings of polycarbonate and then cured and the polycarbonate moldings optionally undergo further shaping before the final curing of the coatings.

The present invention also relates to the moldings of thermoplastic polycarbonates which have been coated by the process according to the invention.

BACKGROUND OF THE INVENTION

Polycarbonate moldings are widely used by virtue of their excellent properties such as transparency, impact strength and tensile strength. The properties of the surface of the material, such as its low resistance to abrasion and scratching and low resistance to solvents, are, however, unsatisfactory for many fields of application. In particular, the surface of the material tends to become opaque in contact with the environment. Numerous methods have been proposed for overcoming this defect, e.g. the use of special coatings based on siloxane or melamine resins. Such processes are described e.g. in U.S. Pat. No. 3,707,397 and U.S. Pat. No. 3,843,390.

These coatings are, however, difficult to prepare and have disadvantages, e.g. these lacquers or coatings are applied from solvents and cross-linking is carried out at elevated temperatures, and this treatment may adversely affect the properties of the polymeric substrate. Moreover, such systems must be built up in several layers and are so brittle that they cannot be used on parts which will be subjected to considerable bending stresses.

It is also known to provide moldings of polycarbonate with a coating a poly(meth)acrylate, e.g. by coating the molded part with a lacquer based on poly(meth)acrylate, as described e.g. in WO 86/04592, or by hot pressing polycarbonate panels with (meth)acrylate films.

Although such a coating on a polycarbonate molding is able to render the system weatherproof, especially when the polyacrylate film applied to the polycarbonate contains a UV absorbent, these coatings have virtually no effect on the scratch resistance.

UV - curable lacquer systems appear to be particularly suitable as coatings systems for polycarbonate owing to their rapid curing. Examples are described in U.S. Pat. No. 3,968,305 and PCT Application WO 80/00968. Neither of these systems, however, is ideal as they both lack sufficient adherence to their substrate and have unsatisfactory mechanical properties and insufficient scratch resistance.

EP 0,274,595 and EPA 0,274,596 describe the use of polyfunctional acrylates as suitable coating compounds. These coatings, however, can only be cured under $N_2$.

The last two examples given show up a serious disadvantage of radical UV curing, namely $O_2$-inhibition. All radically UV curing coating systems suffer from this inhibition to a greater or less extent, i.e. the progress of the reaction is inhibited by atmospheric oxygen. The result is that the surface layers are not cured or not completely cured and the coatings are smeary.

Radically UV cured coatings have the further disadvantage that the reaction cannot be reactivated after the coating has been applied and partly cured; this means that no after-curing takes place. Moreover, the reaction cannot be controlled and proceeds in a completely uncontrolled manner. It would, however, be desirable to control the degree of curing. This would make it possible to coat the moldings with the lacquer, partly cure the lacquer, and only then convert the molding into the required shape and subsequently complete the curing of the lacquer. This would not be possible for brittle acrylate layers as the subsequent shaping process would cause the lacquer to split off or at least form cracks.

Radically UV cured coatings only cure in the areas which are irradiated by UV light. This technology is therefore virtually limited to plane substrates since very spherical substrates, in other words 3-dimensional substrates, contain areas which lie in the "shadow of the light" and therefore cannot be cured. The possibility of reactivation after UV irradiation could solve this problem as these coated 3-dimensional substrates could then first be partly cured by UV irradiation and the coating could subsequently be completely cured by some suitable measure.

It was therefore an object of the present invention to provide irradiation curb coating compositions which when applied to polycarbonates give rise to scratch resistant coatings which are not subject to any inhibition by $O_2$ and in which the progress of polymerization can be controlled as required by suitable measures.

It has now surprisingly been found that a coating composition based on siloxanes containing epoxy groups and optionally mixed with other compounds containing epoxy groups or hydroxyl groups satisfy these requirements.

UV curable polysiloxanes containing epoxy groups are disclosed in U.S. Pat. No. 4,279,717. They are used for coating paper, polyethylene or polypropylene.

UV curable polysiloxanes containing epoxy groups have also been proposed for release coatings in U.S. Pat. No. 4,576,999.

The curing of these polysiloxanes is promoted by monomeric epoxy compounds (column 10, lines 29 et seq of U.S. Pat. No. 4,576,999).

Suitable photoinitiators are, for example, diethoxyacetophenones and iodonium salts (see Example 19 of U.S. Pat. No. 4,576,999).

Polyester films are mentioned inter alia as suitable for being coated with these materials (column 10, line 62) but the materials are particularly suitable for paper.

It was not obvious in the light of the above to use such systems for coating polycarbonate moldings since in view of the special properties of polycarbonate, e.g. its sensitivity to tension cracking, its chemical resistance, surface properties, etc. one would expect that only coatings specifically adapted go to polycarbonate would be suitable. Further, the compositions mentioned in U.S. Pat. No. 4,576,999 do not have the required high scratch resistance and are relatively soft, flexible lacquer formulations adapted to the mechanical properties of their substrates (paper or plastics film).

DETAILED DESCRIPTION OF THE INVENTION

The polysiloxanes used as component A) which contain epoxy groups and are free from OH groups are compounds having from 2 to 20 Si atoms, preferably from 4 to 12 Si atoms.

They are prepared by, for example, the reaction of siloxane hydrides with olefinically unsaturated compounds containing epoxy groups.

The siloxane hydrides in the present context are compounds containing one or more of the structures A I, A II and/or A III:

wherein $R^1$, $R^2$ and $R^3$ denote, independently of one another, H, $C_1$-$C_5$-alkyl or phenyl, under the condition that at least one of the groups R on at least one Si atom is H.

Examples of $C_1$-$C_5$-alkyl groups include $CH_3$, $C_2H_5$, $C_3H_7$, iso-$C_3H_7$, $C_4H_9$, iso-$C_4H_9$ and $C_5C_{11}$, the preferred groups being $CH_3$ and $C_2H_5$.

The phenyl group may be a substituted phenyl group and the substituents may be $C_1$-$C_4$-alkyl and/or $C_1$-$C_4$-alkoxy such as $CH_3$—O—, $C_2H_5$—O—, $C_3H_7$—O—, iso-$C_3H_7$—O—, $C_4H_9$—O— and iso-$C_4H_9$—O—.

The following compound is an example of a suitable siloxane hydride:

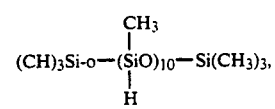

The conversion of such a siloxane hydride to the siloxane containing epoxy groups may be represented by the following reaction equation:

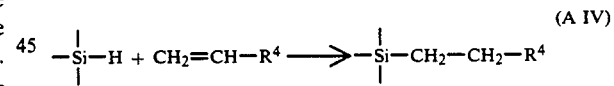

wherein
$CH_2$=CH—$R^4$ stands for a vinyl- or alkyl-functionalized epoxy compound.

Vinyl-functionalized epoxy compounds and alkyl-functionalized epoxy compounds are known. Those used in the present context should preferably have from 4 to 15 carbon atoms and should preferably be aliphatic or cycloaliphatic.

Examples of suitable vinyl-functionalized epoxy compounds include vinyl-norbornene monoxide, vinyl-cyclohexene oxide, dicyclopentadiene oxide and acrylic acid esters of epoxidized alcohols, such as glycidyl acrylate.

Examples of suitable allyl-functionalized epoxy compounds include allyl ethers of epoxidized alcohols, such as allyl-glycidyl ether.

Vinyl- or allyl-functionalized epoxy compounds of the type mentioned above may, for example, correspond to the following formulae:

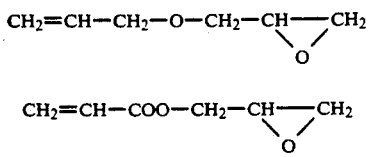

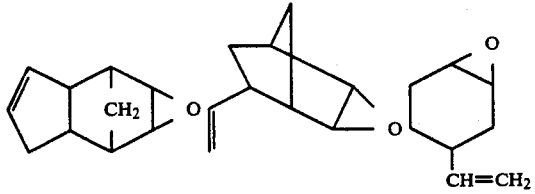

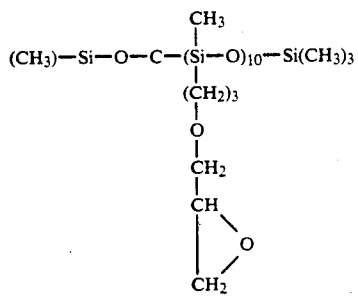

Epoxy group-containing polysiloxanes suitable for use as component A according to the invention should contain from 2 to 40% by weight, preferably from 3 to 25% by weight, of epoxy groups.

Polysiloxanes suitable for use as Component A) according to the invention are also known from the literature (see, for example U.S. Pat. Nos. 4,576,999 and 4,279,717 both of which are incorporated herein by reference).

The polysiloxanes used as Component A) are preferably the compounds used in the Examples, such as

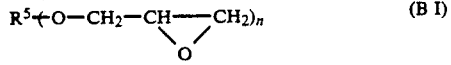

Other compounds containing epoxy groups and free from OH groups used as Component B) are preferably aliphatic epoxy compounds and cycloaliphatic epoxy compounds. The number of epoxy groups is from 1 to 6, preferably from 1 to 3.

Examples of aliphatic epoxy compounds include those corresponding to formula (B I)

$$R^5+O-CH_2-CH\underset{O}{-}CH_2)_n \qquad (B\ I)$$

wherein
n stands for an integer of from 1 to 6, preferably from 1 to 3 and
$R^5$ stands for an n-bonded $C_1$-$C_{15}$-alkane or an n-bonded $C_6$-$C_{36}$-aromatic compound.

Examples of $C_1$-$C_{15}$-alkanes denoted by R include methane, ethane, propane, butane, isobutane and the isomeric pentanes, hexanes, octanes, decanes, dodecanes and pentadecanes. Examples of $C_6$-$C_{36}$-aromatic compounds denoted by $R^5$ include benzene, naphthalene, anthracene, alkyl-substituted benzenes, halogen-substituted benzenes, diphenyls which are optionally alkyl substituted, and compounds corresponding to formula (B I¹):

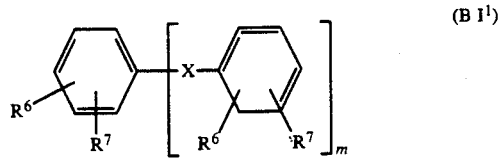

wherein m stands for 1 or 2 and $R^6$ and $R^7$ denote, independently of one another, H, Br, Cl, $CH_3$ or $C_2H_5$ and X stands for a bridging member such as O, S, $SO_2$, CO, a $C_1$-$C_5$-alkylidene or a $C_3$-$C_{10}$-cycloalkylidene.

Methylene and isopropylidene are preferred $C_1$-$C_5$-alkylidenes and cyclopentylidene, cyclohexylidene and alkyl substituted cyclopentylidenes and cyclohexylidenes are preferred $C_3$-$C_{10}$-cycloalkylidenes, e.g. 3,5,5-trimethylcyclohexylidene and 2,4,4-trimethylcyclopentylidene.

These epoxy compounds corresponding to Formula (B I) are known from the literature (see, for example, U.S. Pat. No. 3,018,262 or "Handbook of Epoxy Resins", Lee and Neville, McGraw-Hill Book Co., New York 1967) or may be obtained by known processes, for example by the reaction of a polyvalent phenol such as a diphenol with epichlorohydrin.

One example of such compounds is the bis-epoxidized propoxy ether of bisphenol A corresponding to the following formula:

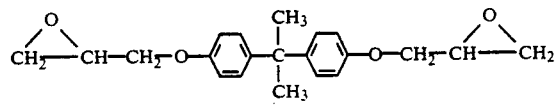

Further examples of aliphatic epoxy compounds include octadecylene oxide, epichlorohydrin, dipentene dioxide, glycidyl and styrene oxide.

The following are examples of cycloaliphatic epoxy compounds: Epoxycyclohexane carboxylates such as 3,4-epoxy-cyclohexylmethyl-3,4-epoxy-cyclohexane carboxylate, 3,4-epoxy-2-methylcyclohexylmethyl-3,4-epoxy-2-methyl-cyclohexanecarboxylate and bis-(3,4-epoxy-6-methylcyclo-hexylmethyl)-adipate. Such epoxide group-containing compounds are described in U.S. Pat. No. 3,117,099. Vinyl-cyclohexene oxide and bis-(2,3-epoxycyclopentyl)-ether are further examples.

The compounds used as Component C), which are free from epoxy groups but contain hydroxyl groups, are monomeric or polymeric compounds having at least one, preferably from 2 to 10 alcoholic OH groups and their molecular weights Mn (number average molecular weight determined by gel permeation chromotography) may be up to 10,000.

The OH group-containing compounds may be liquid or solid.

The following are examples: Alkanols, alkyl ethers of polyoxyalkylene glycols, alkylene glycols and polyhydroxy compounds. The following are special examples: 1,2-ethanediol, 1,2- and 1,3-propanediol, diethylene glycol, triethylene glycol, 1,2-, 1,3-, 2,3- and 1,4-butanediol, 2-ethyl-1,6-hexanediol, bis-(hydroxymethyl)cyclohexane, 1,18-dihydroxyoctadecane, 3-chloro-1,2-propanediol, glycerol, trimethylolpropane, pentaerythritol, sorbitol, polyoxypropylene glycols and polyoxyethylene glycols and polyoxytetramethylene glycols having molecular weights from about 200 to about 10,000, preferably from 500 to 2,500.

Photoinitiator suitable for use as Component D) according to the invention are those which are capable of polymerizing epoxides.

Examples of suitable photoinitiators include those which when irradiated by UV light release a Lewis acid capable of initiating the polymerization of the epoxy groups.

Such photoinitiators are known and may be prepared by known methods (J. Am. Chem. Soc. 91, (1969), 145; J. Org. Chem. 35 (1970), 2532; U.S. Pat. No. 2,807,648; Bull. Soc. Chem. Belg. 73 (1964), 546; J. Am. Chem. Soc. 51 (1929), 2587) all incorporated by reference herein.

The photoinitiators suitable for this invention belong to the class of onium salts and may be subdivided into three groups, namely halonium photoinitiators, onium photoinitiators containing elements of Group VIa of the Periodic System of Elements, e.g. the sulphonium photoinitiators, and, thirdly, phosphonium photoinitiators.

Onium salts of the above-mentioned type used as photoinitiators are known, for example from U.S. Pat. No. 4,026,707, U.S. Pat. No. 3,981,897 and U.S. Pat. No. 4,069,055. The following are examples of typical and frequently used compounds of this type:

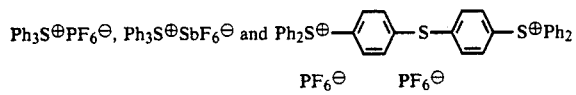

$Ph_3S^{\oplus}PF_6^{\ominus}$, $Ph_3S^{\oplus}SbF_6^{\ominus}$ and $Ph_2S^{\oplus}$—〈 〉—S—〈 〉—$S^{\oplus}Ph_2$
$PF_6^{\ominus}$ $PF_6^{\ominus}$ Sensitizers suitable for use as Component E) according to the invention are known (see, for example, Kirk-Othmer, Encyclopedia, Vol.2, pages 194–197, 2nd Edition, John Wiley & Sons, 1965).

The following are typical examples of these sensitizers: 4,4'-(Bis-dimethylamino)-benzophenone, benzoflavine, thioxanthone, aminoxanthenes and Acridine yellow.

Components A), D), E) and optionally B) and/or C) are mixed together by the usual methods, e.g. at room temperature with the exclusion of direct light.

Additives conventionally used for coatings applied to polycarbonates, such as stabilizers, UV absorbents and dyes, may be added in such quantities to the compositions to be used according to the invention, either during or after their preparation, that photopolymerization and the transparency of the coatings are not impaired.

The coating according to the invention of the polycarbonate moldings may be carried out by conventional processes such as immersion, spraying, centrifuging or roller application to the polycarbonate moldings, spraying and immersion processes being particularly suitable.

Curing of the coatings may be by, for example, UV irradiation, using ordinary commercial UV irradiators, and this may be followed by tempering of the coatings.

The coated polycarbonate moldings may also be heated before they are cured, possibly by means of IR irradiators, and may then be cured by UV irradiation at an elevated temperature.

According to another advantageous embodiment of the coating process according to the invention, polymerization of the coating is only induced photochemically, the coated polycarbonate moldings are converted into their final shape and polymerization is then completed, preferably by tempering at an elevated temperature which should not exceed the glass temperature of the molded body. The final polymerization may also be carried out at room temperature, but this takes longer.

Thermoplastic polycarbonates for the purpose of the present invention are known. Particularly suitable are the polycondensates obtainable by the reaction of diphenols, in particular of dihydroxydiarylalkanes and/or dihydroxydiarylcycloalkanes, with phosgene or diesters of carbonic acid; in addition to unsubstituted diphenols, it is also suitable to use diphenols whose aryl groups carry methyl groups or halogen atoms in the o- and/or m-position to the hydroxyl group. Branched polycarbonates are also suitable.

The polycarbonates have average weight average molecular weights Mw of from 10,000 to 100,000, preferably from 20,000 to 40,000, determined by measuring the relative viscosity in $CH_2Cl_2$ at 25° C. and at a concentration of 0.5 g/100 ml.

The following are examples of suitable diphenols: Hydroquinone, resorcinol, 4,4'-dihydroxydiphenyl and bis-(hydroxyphenyl)-alkanes, such as $C_1$–$C_8$- alkylene or $C_2$–$C_8$- alkylidene bis-phenols, bis-(hydroxyphenyl)-cycloalkanes such as $C_5$–$C_{15}$- cycloalkylene- and $C_5$–$C_{15}$-cyclo-alkylidenebisphenols and bis-(hydroxyphenyl)-sulphides, -ethers -ketones, -sulphoxides or -sulphones. $\alpha,\alpha'$-Bis(hydroxyphenyl)-diisopropylbenzene and the corresponding compounds alkylated or halogenated in the nucleus are also suitable. The polycarbonates are preferably based on bis(4-hydroxy-phenyl)-propane-(2,2) (bisphenol A), bis-(4-hydroxy-3,5-dichlorophenyl)-propane-(2,2) (tetrachlorobisphenol A), bis-(4-hydroxy-3,5-dibromo-phenyl)-propane-(2,2) (tetrabromobisphenol A), bis-(4-hydroxy-3,5-dimethyl-phenyl) -propane- (2, 2) (tetramethylbisphenol A) bis-(4-hydroxy-phenyl)-cyclohexane-(1,1) (bisphenol Z), $\alpha,\alpha'$-bis-(4-hydroxy-phenyl)-p-diisopropylbenzene or bis(4-hydroxyphenyl)-3,5,5-trimethylcyclohexane.

Other diphenols suitable for the preparation of the polycarbonates are described in U.S. Pat. Nos. 2,970,131, 2,991,273, 2,999,835, 2,999,846, 4,982,014, 3,028,365, 3,062,781, 3,148,172, 3,271,367 and 3,275,601.

The polycarbonates, their preparation and their use for the production of molded articles are also described in, for example, "Chemistry and Physics of Polycarbonates", Polymer Rev. Volume 9, Interscience Publishers. They are optionally prepared with the addition of known chain terminators (see EP-A 0,010,602, DE-OS 3,143,252), branching agents such as trisphenols and/or isatin-biscresol (phenol) (see German Offenlegungsschriften Nos. 1,570,533, 1,595,762 and 2,500,092), stabilizers such as phosphanes and/or phosphites (see EPA 0,143,906, DE-OS 2,140,207) and mold release agents (see German Offenlegungsschriften Nos. 2,507,748, 2,729,485 and 2,064,095). The polycarbonates may also contain UV absorbents.

Production of the moldings from the thermoplastic polycarbonates may be carried out by, for example, extrusion or injection molding. Films may also be prepared by the casting process.

Examples of molded products produced from the thermoplastic polycarbonates coated according to the invention include articles of use of all types, electrical articles, covering plates, light shutters, safety panes, solid panels and hollow chamber panels.

These coated polycarbonate moldings may be used in areas where the risk of abrasion and formation of scratches is particularly high, for example for car lamp shields.

The invention is further illustrated but is not intended to be limited by the following examples in which all parts and percentages are by weight unless otherwise specified.

EXAMPLES

The coating compositions described in the following examples were applied by means of a spin coater to plates of bisphenol-A homopolycarbonate measuring 105×150×3 mm. The speed of rotation was varied so that the thickness of the coating after curing was from 5 to 10 μm. A UV irradiation installation of IST company, Model 200-11-1-Tr was used for curing.

The speed of the band was 2 re/min. The coating was then after-tempered at 80° C. for 2 hours. Unless otherwise indicated, the coating compositions are tack-free but not yet scratch resistant immediately after UV irradiation.

Bonding Strength

To assess the adherence of the coating, a grid section test was carried out by cutting a raster of 6×6 lines 1 mm apart into the coating and then applying an adhesive tape thereto by pressure and immediately removing it. The classification into Gt 0 to Gt 5 was according to the conditions laid down in DIN 53 151. Gt0 is the best result and Gt5 the worst.

Scratch resistance

The scratch resistance was determined by rubbing the sample with steel wool of Class 0000. The properties were characterized as follows:

++ slight traces of scratches after prolonged, severe rubbing 0 individual deep scratches, coating slightly dull due to numerous small scratches after prolonged, powerful rubbing − scratches after only slight rubbing.

The following polysiloxanes were used as Component A):

1. $(CH_3)_3Si-O-(Si-O)_{\overline{10}}-Si(CH_3)_3$ with side chain $-(CH_2)_3-O-CH_2-CH\underset{CH_2}{\overset{O}{\diagup\diagdown}}$ on Si center, with CH$_3$ on Si

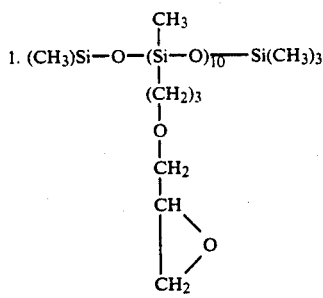

2. $(CH_3)_3-Si-O-(Si-O)_{\overline{74}}Si(CH_3)_3$ with side chain $-(CH_2)_3-O-CH_2-CH\underset{CH_2}{\overset{O}{\diagup\diagdown}}$, with CH$_3$ on Si

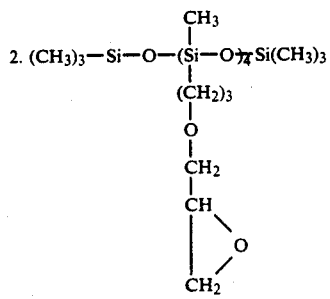

3. $Si-O-(Si-O)_{\overline{15}}-Si$ with $(CH_3)_2$, $(CH_2)_3$, and epoxide side chains (as shown)

The following were used as Component B:

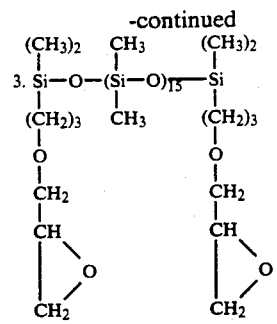

1. 
2. Cyracure UVR 6200 of Union Carbide (cycloaliphatic epoxide).
3. Cyracure UVR 6100 of Union Carbide (cycloaliphatic epoxide):
4. Cyracure UVR 6110 of Union Carbide (cycloaliphatic epoxide).
5. Cyracure UVR 6351 of Union Carbide (cycloaliphatic epoxide).

Triethylene glycol was used as Component C).

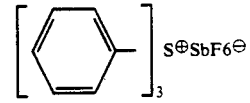

was used as Component D (Cyracure UVI 6974 of Union Carbide). Anthracene was used as Component E.

The following coating compositions were prepared:

| Example | A$_1$ | A$_2$ | A$_3$ | B$_1$ | B$_2$ | B$_3$ | B$_4$ | B$_5$ | C | D | E |
|---|---|---|---|---|---|---|---|---|---|---|---|
| 1 | 100 | | | | | | | | | 3 | |
| 2 | 50 | | | 50 | | | | | | 3 | |
| 3 | 80 | | | | | 20 | | | | 3 | |
| 4 | | 50 | | | | 50 | | | | 3 | |
| 5 | | | 20 | 70 | 10 | | | | | 3 | |
| 6 | 33 | | | | | 33 | 33 | | | 2 | |
| 7 | 25 | | | | | 25 | 25 | 25 | | 2 | |
| 8 | | 80 | | | | | 20 | | | 2 | |
| 9 | 80 | | | 20 | | | | | | 2 | 0.2 |
| 10 | 80 | | | 15 | | | | | 5 | 2 | |
| 11 | | | | | 100 | | | | | 2 | |
| 12 | | | | | 20 | | 40 | 40 | | 2 | |

(Figures in percent)

Assessment of the coating compositions:

| Example | Scratch resistance | Adherence | Visual assessment of lacquer coat |
|---|---|---|---|
| 1 | ++ | Gt 1 | + |
| 2 | ++ | Gt 0 | ++ |
| 3 | ++ | Gt 0 | + |
| 4 | 0 | Gt 0 | ++ |
| 5 | 0 | Gt 0 | + |
| 6 | ++ | Gt 1 | ++ |
| 7 | ++ | Ct 2 | + |
| 8 | ++ | Gt 1 | + |

-continued

| Example | Scratch resistance | Adherence | Visual assessment of lacquer coat |
|---------|--------------------|-----------|-----------------------------------|
| 9 | ++ | Ct 0 | + |
| 10 | 0 | Gt 0 | + |
| 11 |   | Gt 0 | + |
| 12 |   | Gt 0 | 0 |

Visual assessment:
++ very smooth surface, free from faults
+ smooth surface, free from faults
0 smooth surface, isolated faults To determine the possible presence of $O_2$ inhibition, Example 2 was irradiated once under nitrogen and once in atmospheric air and then after-tempered at 80° C. for 2 hours. The scratch resistance was determined as above. For comparison (VI), a mixture of 50 parts of hexanediol acrylate and 50 parts of trimethylolpropane triacrylate with 3% by weight of 2,2-dimethyl-2-phenylacetophenone as photoinitiator according to EP-A 0,274,596 was cured once under nitrogen and once in atmospheric air.

| Example | Scratch resistance |
|---------|--------------------|
| 2/air | ++ |
| 2/N$_2$ | ++ |
| VI/air | − |
| VI/N$_2$ | + |

To determine whether the article could subsequently be deformed, a 250 μm film of bisphenol-A-homopolycarbonate was coated with coating composition 2, cured with UV, bent over a mandrel having a radius of 1 cm, fixed and then after-tempered at 80° C. for 2 hours. A perfect coating was obtained. Example No. 8 of DOS 3,819,627 A1 was used for comparison. When this was bent over a mandrel of the same radius after UV curing, the coating was found to have distinct cracks.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of protecting the surface of a polycarbonate-molded article comprising applying to said surface a UV curable composition containing
   A) from 10 to 100% by weight of a polysiloxane which contains epoxy groups and is free from OH groups
   B) from 0 to 90% by weight of compounds other than A) also containing epoxy groups and free from OH groups and
   C) from 0 to 40% by weight of compounds free from epoxy groups but containing hydroxyl groups
   wherein the percentages by weight of components A)+B+C) add up to 100%, and
   D) from 0.1 to 15% relative to the weight of A)+B)+C) of at least one photoinitiator and optionally
   E) from 0 to 0.5% relative to the weight of A)+B)+C) of at least one sensitizers, and curing said composition by UV radiation.

2. The method of claim 1 wherein said A is present in an amount of from 28 to 88% and said B is present in an amount of from 10 to 70% and said C is present in an amount of from 2 to 20%.

3. The method of claim 1 wherein said A is present in an amount of from 45 to 85% and said B is present in an amount of from 10 to 50% and said C is present in an amount of from 5 to 15%.

4. The method of claim 1, characterized in that said article is subjected to shaping before said curing and after said applying of said composition.

5. A polycarbonate molding prepared by the method of claim 1.

6. A polycarbonate molding prepared by the method of claim 4.

* * * * *